United States Patent [19]
Hirasawa et al.

[11] Patent Number: 6,097,511
[45] Date of Patent: *Aug. 1, 2000

[54] VIDEO CAMERA WITH INTERRUPTION OF RECORDING UPON DETECTION OF IMPROPER MOUNTING OF INTERCHANGEABLE LENS

[75] Inventors: Masahide Hirasawa, Kanagawa-ken; Toshiaki Mabuchi, Tokyo; Isao Harigaya; Ryunosuke Iijima, both of Kanagawa-ken, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/361,450

[22] Filed: Dec. 21, 1994

Related U.S. Application Data

[63] Continuation of application No. 08/218,687, Mar. 28, 1994, abandoned, which is a continuation of application No. 08/036,230, Mar. 24, 1993, abandoned, which is a continuation of application No. 07/391,179, Aug. 9, 1989, abandoned.

[30] Foreign Application Priority Data

Sep. 2, 1988 [JP] Japan .................................. 63-218507
Sep. 2, 1988 [JP] Japan .................................. 63-218508
Nov. 30, 1988 [JP] Japan .................................. 63-300843
Nov. 30, 1988 [JP] Japan .................................. 63-300847

[51] Int. Cl.$^7$ ....................................................... H04N 5/76
[52] U.S. Cl. ........................................... 358/906; 386/107
[58] Field of Search ................................... 358/906, 335, 358/909.1; 360/35.1; 348/372, 730; 354/286; 386/107, 117, 38, 46; H04N 5/76

[56] References Cited

U.S. PATENT DOCUMENTS

| | | | |
|---|---|---|---|
| 4,400,743 | 8/1983 | Takimoto et al. | 358/906 |
| 4,464,034 | 8/1984 | Tomino | 354/286 |
| 4,658,304 | 4/1987 | Tsunakawa et al. | 358/906 |
| 4,717,968 | 1/1988 | Painton et al. | 358/310 |
| 4,733,262 | 3/1988 | Taniguchi et al. | 354/402 |
| 4,782,355 | 11/1988 | Sakai et al. | 358/909 |
| 4,797,737 | 1/1989 | Yazawa | 360/74.1 |
| 4,823,198 | 4/1989 | Okumura | 358/312 |
| 4,888,648 | 12/1989 | Takeuchi et al. | 358/906 |

*Primary Examiner*—Huy Nguyen
*Attorney, Agent, or Firm*—Robin, Blecker & Daley

[57] ABSTRACT

A video camera is provided with a detection circuit for detecting a state in which an interchangeable lens is mounted and a control circuit for stopping recording when the detection circuit detects that the interchangeable lens has not been mounted.

34 Claims, 9 Drawing Sheets

VIDEO CAMERA WITH INTERRUPTION OF RECORDING UPON DETECTION OF IMPROPER MOUNTING OF INTERCHANGEABLE LENS

This is a continuation of application under 37 CFR 1.62 of prior application Ser. No. 08/218,687 filed Mar. 28, 1994 (abn.) which is a continuation of Ser. No. 08/036,230 filed Mar. 24, 1993 (abn.), which is a continuation of Ser. No. 07/391,179 filed Aug. 9, 1989 (aban.).

BACKGROUND OF THE INVENTION

1. Field of the Invention

This invention relates to a system capable of interchanging lenses of a camera, and more particularly to an electronic mount system performing data communication between a lens and the camera body.

2. Description of the Related Art

A camera system whose lens can be interchanged has been mainly employed in silver-halide single-lens reflex cameras. Since a variety of photographs that can exhibit the characteristics of each of the lenses can be taken it has been widely used.

Recently it is desired that the lens interchange system of the type described above be employed in a video camera for the purpose of taking novel animations.

However, when the lens interchange system is employed in the video camera, a problem arises in that the running of the tape with no picture taken occurs if the lens is not mounted on the camera body or the lens is not correctly mounted on the same. As a result, the tape needs to be rewound again to take a picture, so that the shutter chance is lost, or a problem arises in performing the concatenating recording, or a problem of excessive battery power consumption arises. In the case of a video camera in which an optical finder is employed, since a state of imaging cannot be checked, a problem arises in that un-focused images are unintentionally and continuously photographed.

The silver-halide single-lens reflex cameras take, in almost all cases, one second or less to complete the photographing Therefore, the separation of the lens during the photographing time due to some reason or the unintentional removal of the lens with the shutter thereof pressed cannot substantially occur.

On the other hand, since video cameras take a long time to photograph an image, the separation of the lens from the camera body is considerably probable.

Furthermore, when a recording trigger button is pressed once, the recording is continued if the button is not again pressed. For example, if the lens of the video camera is interchanged during a recording of an image with this video camera fixed by a tripod, unnecessary images during the lens interchanging work are recorded on the video tape. In order to overcome this problem, when the video tape is rewound and the recording is again started immediately before the interchange of the lens, the concatenating recording cannot be conducted satisfactorily.

Furthermore, if the power switch of the camera body is unintentionally switched on by the user or the like, power is consumed limitlessly while the camera is taking unnecessary images. In particular, in a case where the power source comprises a battery type source, the wasteful actuation of the camera body for a long time causes the battery to be excessively consumed. As a result, the battery is unintentionally exhausted when a necessary image is intended to be taken with this video camera.

In, the video camera system whose lens can be interchanged and of the type described above, various functions of the video camera (for example, white balance, shutter speed, AE (Automatic Exposure) and the like) need to be adjusted in accordance with the characteristics of the subject lens. In addition, the position of the lens interchanged and the diaphragm of the same needs to be initialized at a proper position so as to prevent malfunction of the control unit in the video camera.

However, the video camera system of the above-described conventional type encounters the following problems since the above-described various functions are not changed after the lens thereof has been changed:

(1) Since the various characteristics of the lens and the imaging conditions are usually varied after the lens has been interchanged, malfunctions can occur in the control system for the lens system in the camera body if the above-described functions which are arranged before the interchange of the lens are left intact.

(2) After the interchange of the lens, the user needs to again switch on the power for the purpose of resetting the functions, or a reset button or the like needs to be provided therein. Furthermore, a problem can occur in that a user forgets the setting of the functions.

SUMMARY OF THE INVENTION

This invention aims to solve the above-stated problems of the video camera of the prior art.

This invention further aims to solve the above-stated problem of the video camera in the waste of power consumption even if the lens unit thereof is separated from the camera body for a long time with the power for the camera unit switched on.

This invention additionally aims to solve the above-stated problem by the provision of a control unit of a video camera system of the type described above and capable of automatically changing the arrangement of the functions that is needed to be performed when the lens are interchanged.

In order to achieve the above-described objects, the embodiment according to the present invention comprises a video camera which comprises: recording means; detection means capable of detecting a state in which an interchangeable lens is mounted; and control means capable of stopping an operation of the recording means when the detection means detects that the interchangeable lens has not been mounted.

According to this invention, if the lens has not been mounted (or mounted incorrectly), the recording is prohibited for the purpose of preventing the running of the tape with no image being recorded and for the purpose of preventing unsatisfactory quality in the concatenating recording or wasteful power consumption.

The other embodiment of this invention comprises a video camera which comprises detection means capable of detecting a state in which an interchangeable lens is mounted; recording means; and control means capable of temporarily stopping a recording operation and rewinding a tape to a predetermined position when the detection means detects that a state in which the changeable lens is mounted becomes defective.

According to this embodiment, if the mounting of the lens becomes incomplete for some reason during the photographing, the recording is temporarily stopped, and the tape is rewound to the portion from which the concatenating recording can be conducted. Therefore, the unnecessary running of the tape corresponding to the state in which the lens is not mounted correctly can be prevented, and the concatenating recording can be satisfactorily conducted.

According to the other embodiment of this invention, the above-described aim is achieved by forming the structure in such a manner that the power source provided for the camera unit is automatically switched off when a certain time period has elapsed from the separation of the lens unit.

As a result of the above-described structure, wasteful power consumption can be prevented in the camera system according to this embodiment since the power source provided for the camera unit can be automatically switched off after a certain time period has elapsed from the separation of the lens unit from the camera unit.

In order to achieve this and according to this invention, when the lens is interchanged, a state in which the lens is mounted is detected in the camera body by detachment recognition means provided for the lens to be interchanged. Furthermore, the state of the arrangement of the functions in a state in which the lens has not been interchanged yet is brought to a proper initial setting state which corresponds to the characteristics of the lens to be interchanged.

As a result of the thus-formed structure, complicated adjustment work at the time of interchange of the lens is not required since the adjustments necessary to bring the camera adjustment function corresponding to the characteristics of the lens can be automatically conducted by a control unit in the camera body by recognizing the mounting of an optional lens to be interchanged on the camera body.

DETAILED DESCRIPTION OF THE PREFERRED EMBODIMENTS

Figure 1:
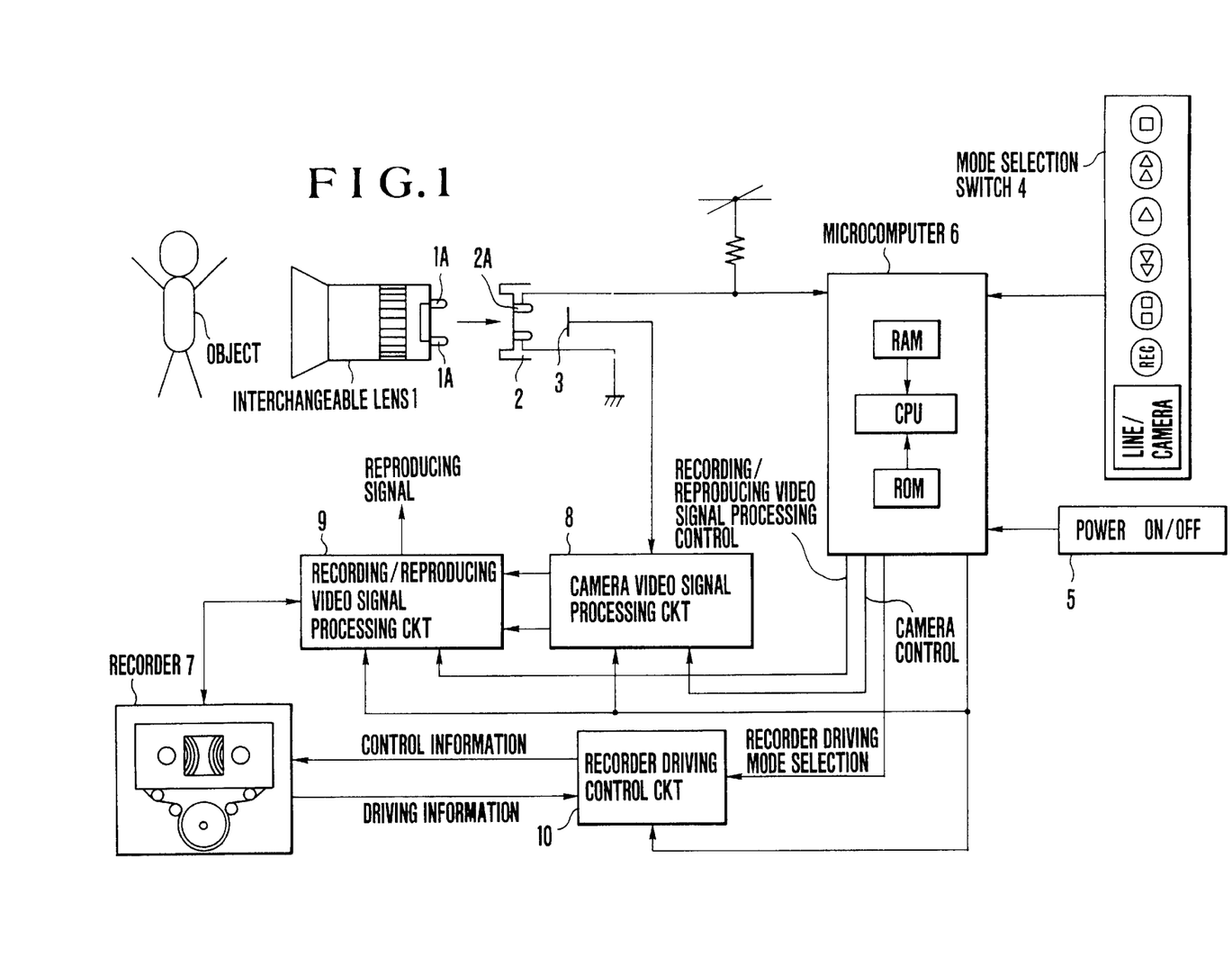
FIG. 1 is a block diagram which illustrates a first embodiment of this invention.

FIG. 1 is a block diagram which illustrates a first embodiment of this inventions where reference numeral 1 represents an interchangeable lens, 2 represents a lens receiving mount forming a portion of the camera body on which the above-described lens 1 is mounted. Lens mounting terminals (projections) 1A are formed at the base end of the lens 1, while a detection switch 2A is provided for the mount 2, this switch 2A being arranged to be switched on by the mounting terminals 1A when the lens 1 is mounted at a predetermined position (when the mounting of this lens 1 on the mount 2 is completed). Reference numeral 3 represents an imaging means (CCD) capable of converting an optical image obtained through the lens 1 into an electric signal.

Reference numeral 4 represents a mode selection switch unit including recording reproducing, fast-forward, rewinding, stop, and line/camera changeover switches.

Reference numeral 5 represents a power source switch, 6 represents a microcomputer including a CPU, a RAM having a region in which data can be temporarily stored, and a ROM in which a program to be described later (see FIGS. 2 and 3) is stored.

Reference numeral 7 represents a video tape recorder capable of recording video signals on a loaded video tape and capable of reproducing video signals from the video tape on which the video signals have been recorded.

Reference numeral 8 represents a camera video signal processing circuit capable of separating a signal output from the imaging means 3 into, for example, a luminance signal and a chrominance signal and outputting the thus-separated signals in response to a control signal supplied from the microcomputer 6. Reference numeral 9 represents a recording/reproducing video signal processing circuit capable of supplying the recording video signal to the video tape recorder 7 after the signal output from the camera video signal processing circuit 8 has been subjected to an FM modulation or the like for the purpose of recording on the video tape or the like loaded on video tape recorder 7. The recording/reproducing video signal processing circuit 9 is further capable of outputting the reproducing video signal after the reproducing video signal supplied from the video tape recorder 7 has been subjected to an FM demodulation or the like. In this circuit 9, the switching between the recording and the reproducing is conducted in response to a control signal from the microcomputer 6.

Reference numeral 10 represents a recorder driving control circuit for controlling the recorder 7 according to a mode based on a driving-mode selection signal supplied from the microcomputer 6 and receiving driving information from the recorder 7.

The power supply to each of the circuits 8, 9, and 10 is switched on or off by the power source switch 5 through the microcomputer 6.

The microcomputer 6 supplies the control signal, in accordance with switching information selected in the mode selection switch unit 4, to each of the circuits 8, 9, and 10. The microcomputer 6 also determines in response to a signal supplied from the detection switch 2A whether or not the lens 1 has been mounted on a predetermined position.

The operation of this embodiment will now be described with reference made to FIG. 2. When the program is started, it detects whether or not the power is on in step S1, it detects whether it is the camera mode or the external line input mode in step S2, and it detects whether or not the camera has been mounted in step S3. If the answers in all of steps S1, S2 and S3 are determined to be "yes", a recording pause processing is conducted in step S4, and it detects whether or not the start button has been pressed in step S5. If it is determined to be "yes", a recording start processing is conducted in Step S6. Then, in step S7, it determines whether or not the recording pause button has been pressed. If it has not been pressed, it determines whether or not the stop button has been pressed in step S8. If it has been pressed, a recording pause processing is conducted in step S9. Then, in step S10, a preparation for the shift from the recording state to the stop state is made, and in step S11 it determines whether or not the preparation has been completed. If it is determined that the preparation has been completed, a stop processing is conducted in step S12, and thus the operation is ended. If it is determined that the mode is not the camera mode in step S2, a recording or reproducing of an external line input signal is conducted in step S13. If it is determined that the lens has not been mounted in step S3, a stop processing is conducted in step S14.

The determination whether or not the lens has been mounted is made only in the camera mode realized after the power is supplied. If the lens has not been mounted, the whole apparatus waits in the stop mode (steps S12 and S14). After the lens has been mounted, a state in which the recording can be performed is automatically realized (step S4) and a wait for a command for starting the recording is performed.

Figure 2:
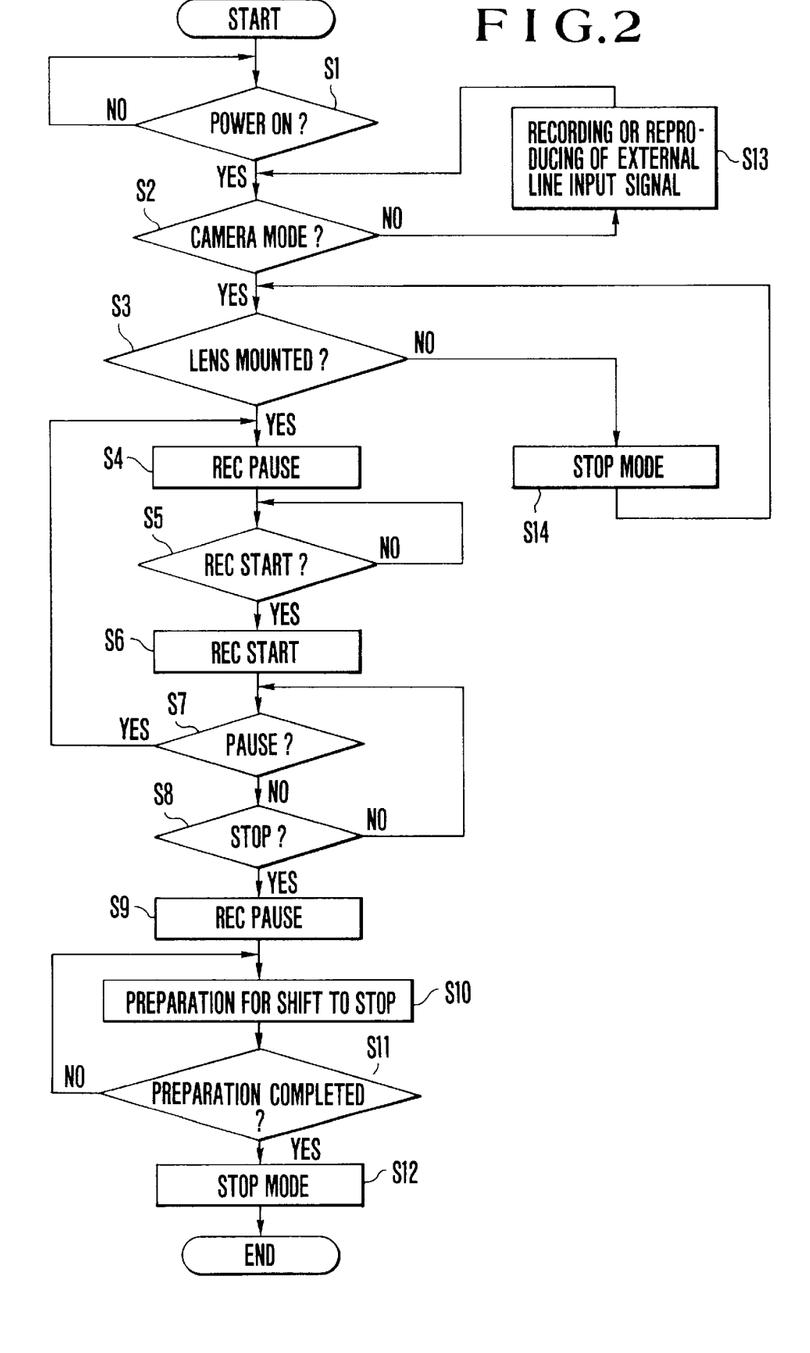
FIG. 2 is a flow chart which illustrates the operation of the first embodiment of this invention.
Figure 3:
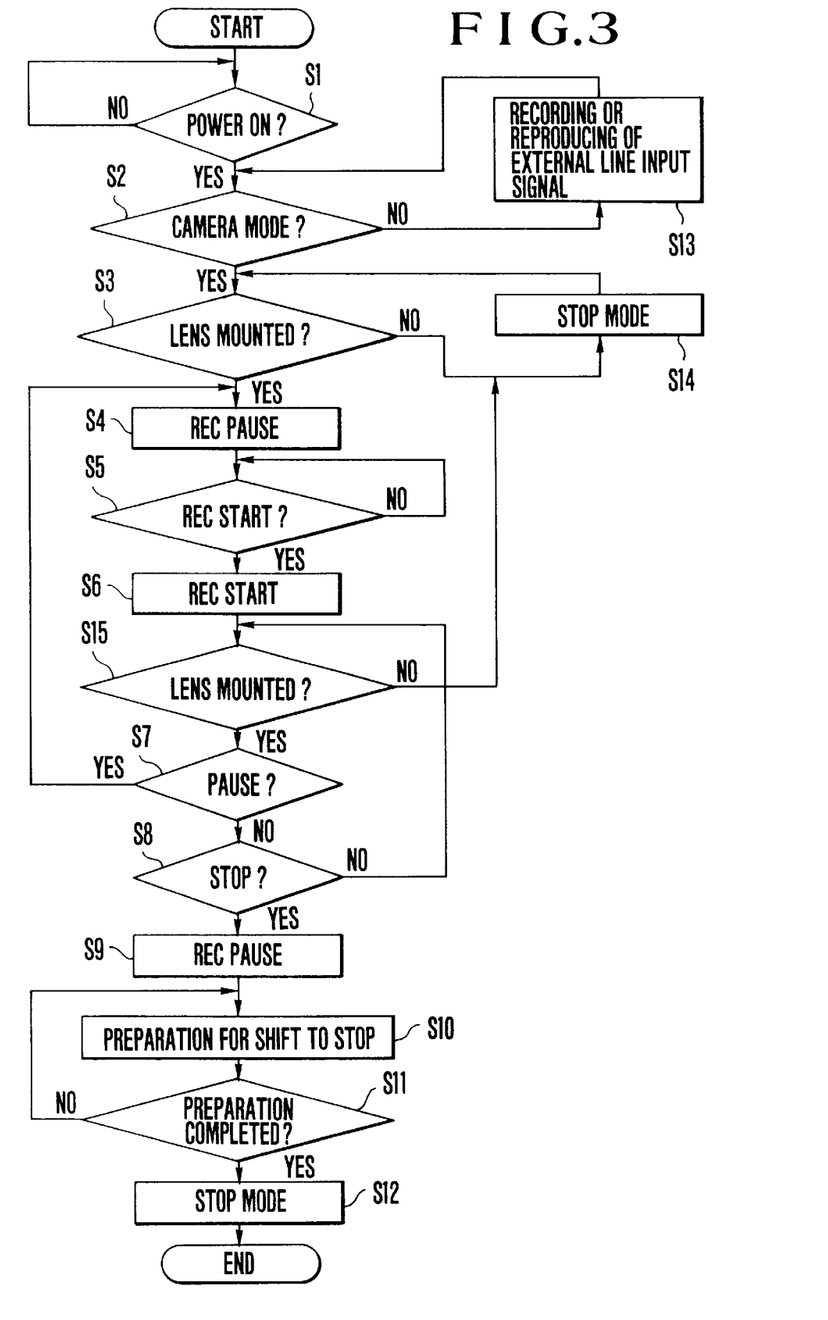
FIG. 3 is a flow chart which illustrates a second embodiment of this invention.

FIG. 3 is a view which illustrates the operation of a second embodiment where the steps having the same functions as those shown in FIG. 2 are given the same reference numerals.

Although only the fact whether or not the lens has been mounted is detected when the power is switched on according to the structure shown in FIG. 2, a determination step S15 is additionally provided between the steps S6 and S7 in the structure according to the embodiment shown in FIG. 3, this determination step S15 being capable of determining whether or not the lens has been mounted. As a result, if the lens comes off for some reason during the recording, the overall apparatus is brought to the stop mode (step S14) in which a wait for the re-mounting of the lens is performed.

A program capable of bringing the operation into the stop made (step S15) if the lens is not mounted correctly, may be provided at an optional position in the flow chart. As a result, if the lens comes off, the operation can be brought to the stop mode whenever the lens comes off.

As described above and according to the first and second embodiments above, any wasteful operation such as running of tape with no image taken, rewinding search, wasteful power consumption, and the like can be prevented by performing a wait for the recording if the lens is not mounted or the same is mounted incorrectly.

The operation of a third embodiment of this invention will be described with reference to FIG. 4. When the program is started, it is determined whether or not the power is switched on in step S1, it is determined whether or not it is the camera mode in step S2, and it is determined or not the lens has been mounted in step S3. If the answers in all of steps S1, S2 and S3 are determined to be "yes", it determines, in step S17, whether or not it is after the lens has been re-mounted. For example, since the state after the power has been switched on is a state after step S3, the determination to be made is "no", causing the flow to advance to step S18. In step S18, the tape is rewound by the length which is needed to perform the usual concatenating recording. Then, in step S19, a recording pause (waiting for recording) mode is realized, and a wait for the press of the recording button is performed in step S20. If it is determined that the recording has been started in step S20, recording is started in step S21 after a reproduction operation needed for performing the concatenating recording has been conducted. Then, it is determined whether or not the lens has been mounted satisfactorily in step S22. In step S23, it is determined whether or not the pause button has been pressed. Then, it is determined whether or not the stop button has been pressed in step S24. If it is determined that the lens has been mounted satisfactorily and simultaneously the pause and stop buttons have not been pressed, the recording is repeated by being circulated through a loop as steps S22-S23-S24-S22. On the other hand, if the lens is, during the shooting, separated from the camera body for some reason, it is detected in step S22, and then the flow advances to step S25 in which the tape is stopped (recording pause), and a wait for the re-mounting of the lens is performed in step S3. If the re-mounting has been completed, the lens is re-mounted in step S17, and the flow advances to step S26 in which a longer (in terms of time) rewinding of the tape is so performed as to restore the recording position just in front of the portion in which the unsatisfactory image is recorded, and the concatenating recording can be thus performed. Then, the flow advances to step S19. If the recording pause button is pressed in step S23, the flow returns to step S17. On the other hand, if the stop button is pressed in step S24, the recording pause processing is performed in step S27, and the preparation for bringing the mode from the recording mode to the stop mode is made in step S28. If the preparation has been completed in step S29, the stopping processing is performed in step S30, and thus the operation is ended here. If it is not the camera mode in step S2, the external line input recording or reproducing processing is performed in step S31.

Figure 4:
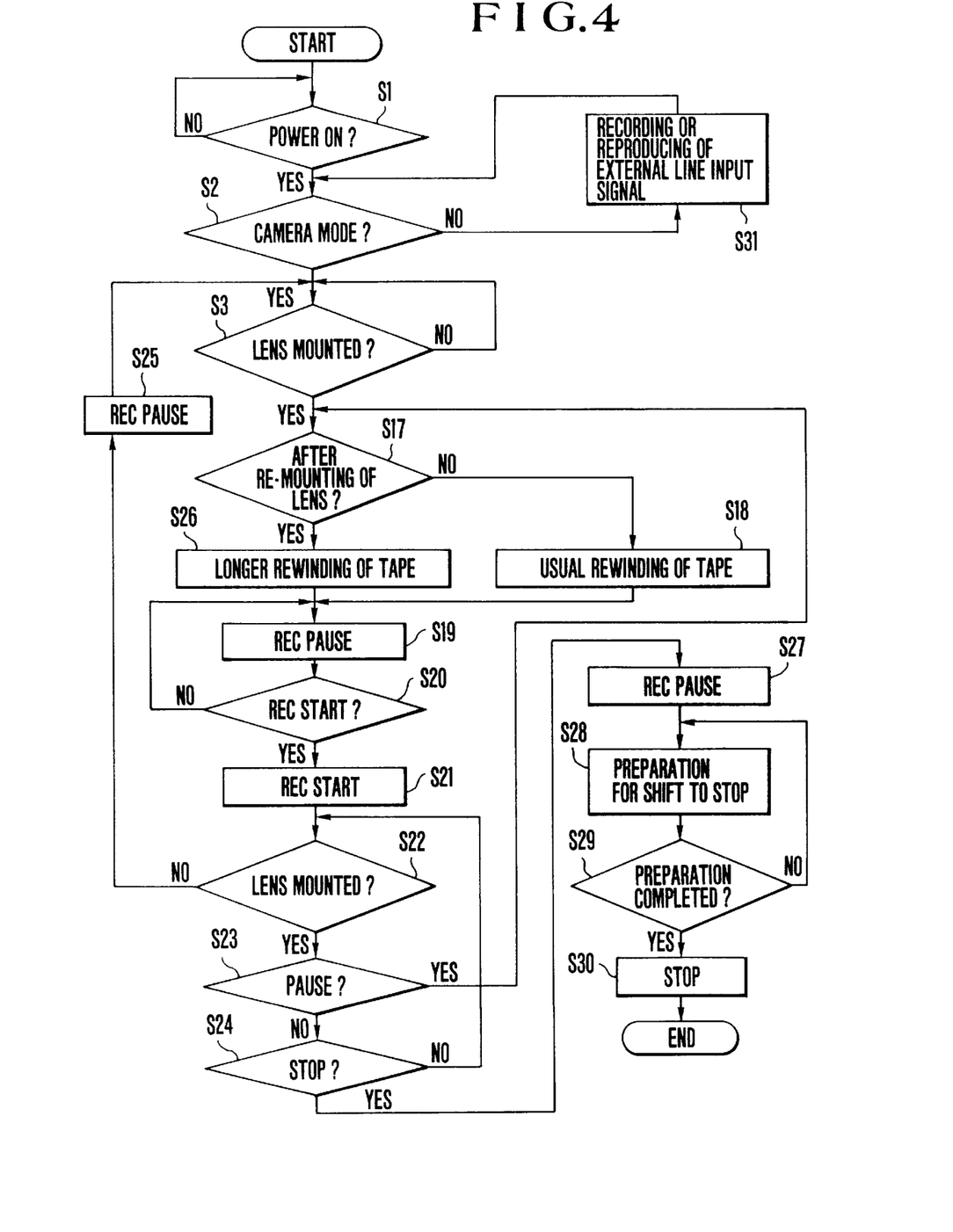
FIG. 4 is a flow chart which illustrates a third embodiment of this invention.
Figure 5:
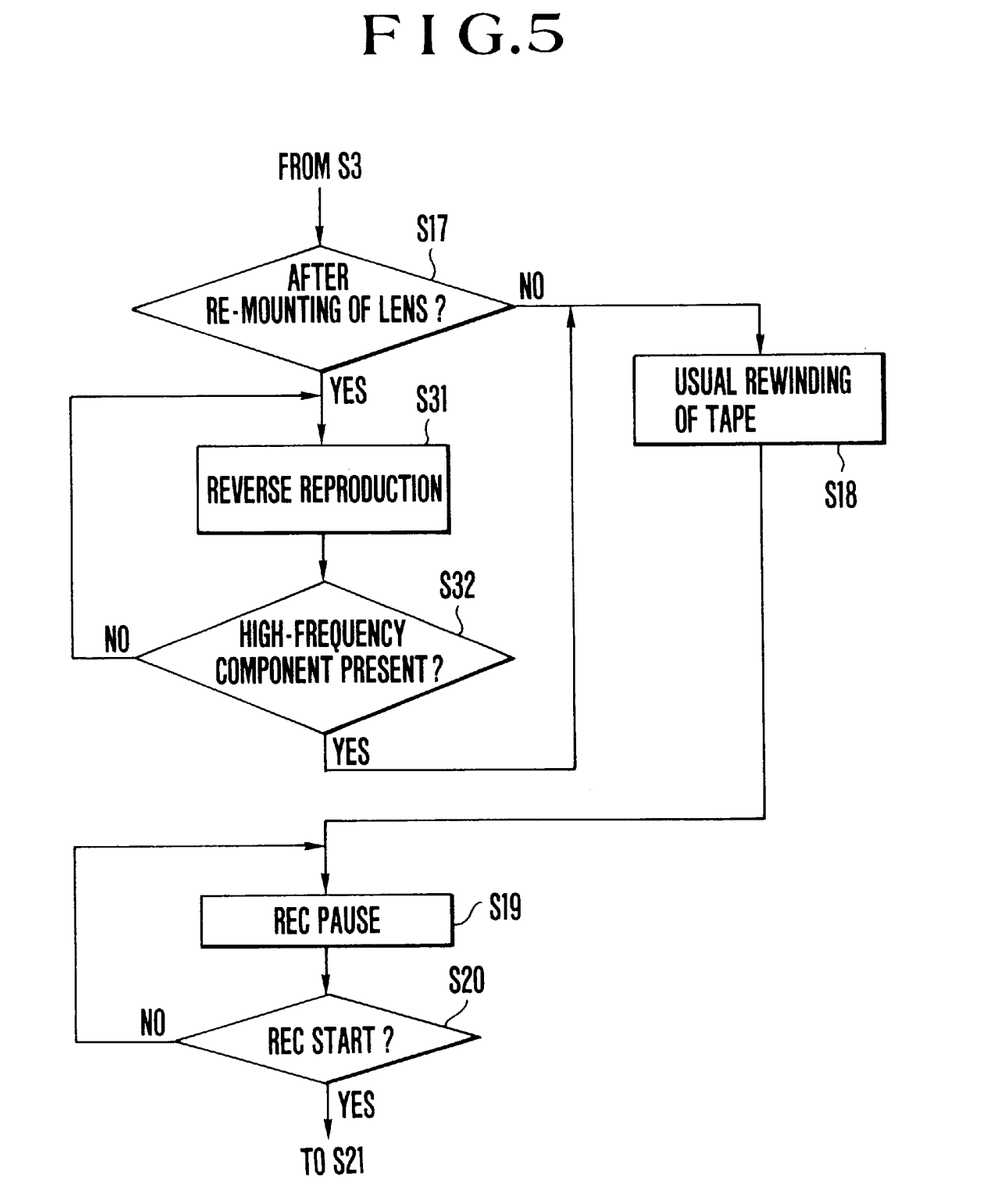
FIG. 5 is a flow chart which illustrates the operation of a fourth embodiment of this invention.

FIG. 5 is a view which illustrates a portion of the operation of a fourth embodiment where the other steps are the same as those shown in FIG. 4. That is, the operation of this fourth embodiment differs from the flow shown in FIG. 4 in the portion related to the tape rewinding. FIG. 5 is a view which is particular illustrates the different portion. Therefore, the flow prior to and behind the state shown in FIG. 5 are the same as that shown in FIG. 4.

If it is determined that the state is not after the re-mounting of the lens, the flow advances to step S18. On the other hand, if it is determined that the state is immediately after the re-mounting, the flow is brought to a reverse reproducing mode in step S31. If the lens comes off, focusing on the imaging plane becomes impossible, causing blur to be rapidly enlarged. In general, if the focusing is realized on the imaging plane, a clear contour of the object can be obtained, causing the high-frequency component of information about an image to be increased. If the contour becomes rapidly blurred, the high-frequency component also rapidly decreases. Therefore, the boundary of the increase and the decrease is searched for with reverse reproducing performed in step S32. The rewinding of the tape is, in step S18, started from the thus-found boundary for the purpose of performing the concatenating recording. Then, the flow advances to step S19. As a result, an unnecessary portion of the tape can be properly erased with too long or too short erasing prevented so that the concatenating recording can be performed.

As described above if the lens comes off during the shooting, the structure is arranged so that the tape is immediately stopped and the tape is rewound by a required length. As a result, the concatenating recording in which no image turbulence is involved can be performed. In addition, since labor of photographing again by searching for the image turbulence with an EVF can be omitted, photographing with a video camera equipped with an interchangeable lens system can be readily conducted.

A fifth embodiment according to this embodiment will now be described.

Figure 6:
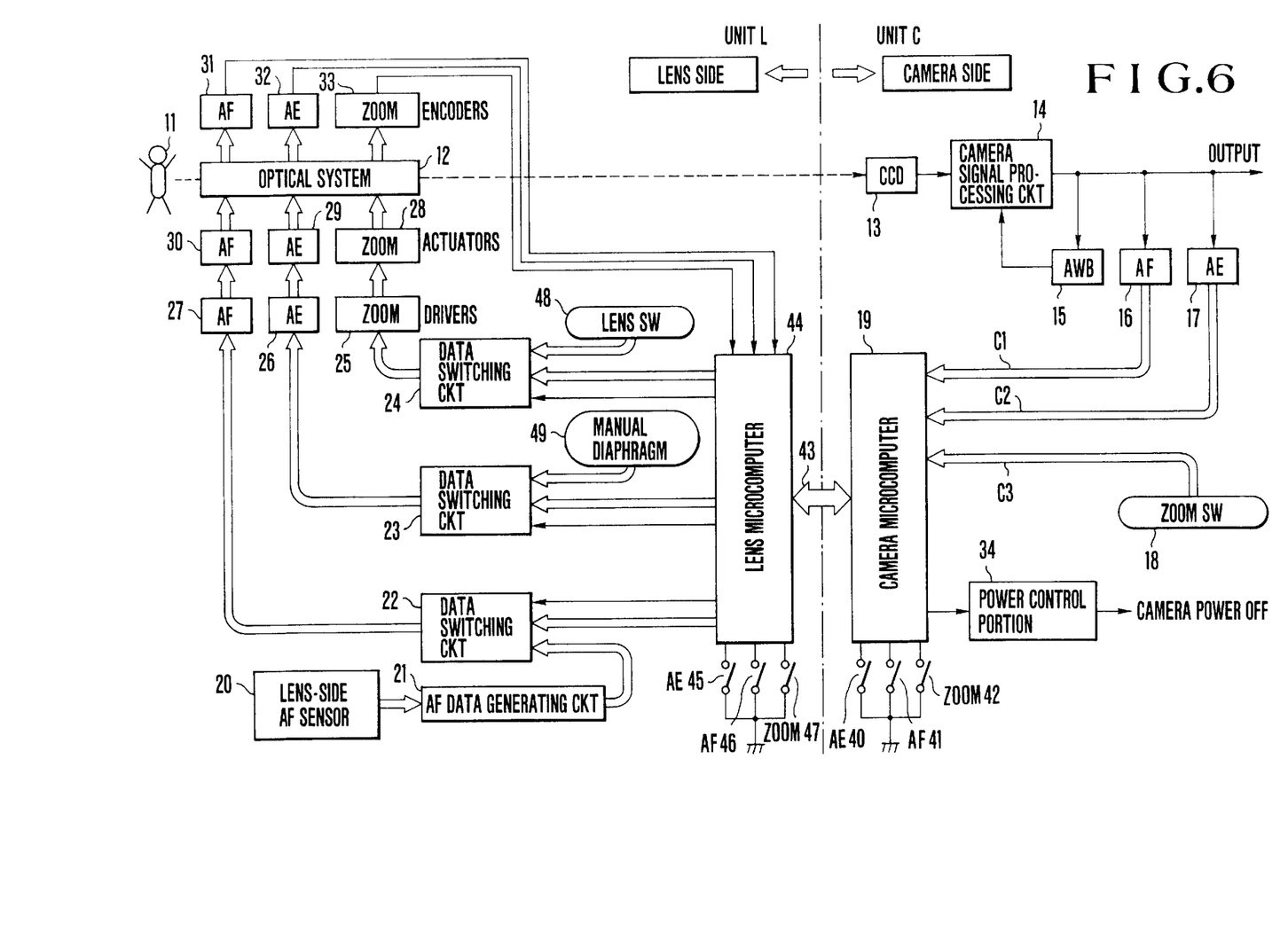
FIG. 6 is a block diagram which illustrates the overall structure of a fifth embodiment of a camera system according to this invention.

FIG. 6 is a block diagram which illustrates the overall structure of the fifth embodiment of a camera system according to this embodiment.

The right-hand portion of the drawing with respect to an alternate long and short dash line illustrates the camera body (a camera unit C), while the left-hand portion of the same illustrates a lens structure (a lens unit L). These two units L and C are arranged to be detachable. Light from an object is imaged on imaging devices 13 such as CCDs in the camera unit C by means of an optical system 12 disposed in the lens unit L. The output from the imaging device 13 is converted into a television signal by a camera signal processing circuit 14. On the other hand, this television signal is utilized in a known automatic adjustment mechanisms such as an AWB (Automatic White Balance) mechanism, an AF (Automatic Focus) mechanism, AE (Automatic Exposure) mechanism, and the like. A variety of control signals are transmitted from control signal generating portions 15, 16, and 17 serving as the control signal sources of the above automatic adjustment mechanisms. An AWB control signal for adjusting the color balance in the camera signal processing is supplied to the processing circuit 14. The other portions of the control signals $C_1$ and $C_2$ are supplied to a camera microcomputer 19. A control signal $C_3$ generated by a zoom switch 18 which acts to determine the focal length of the optical system 12 is also supplied to the camera microcomputer 19. The above-described control signals are, in the form of communication data, supplied to a lens microcomputer 44 in the lens unit L via a data communication line 43. The thus-supplied communication data is temporally received by the lens microcomputer 44. Reference numerals 40, 41, and 42; and 45, 46, and 47 are switches for AE, AF and zoom connected to the camera microcomputer 19 and the lens microcomputer 44, respectively. Reference numeral 34 represents a power control portion capable of generating camera power OFF signal to be described later.

The control signals $C_1$, $C_2$, and $C_3$ supplied to the camera microcomputer 19 are, by the lens microcomputer 44, supplied to the driver circuits 27, 26, and 25 via data switching circuits 22, 23, and 24. Reference numeral 48 represents a lens switch, 49 represents a manual diaphragm, 20 represents a lens-side AF sensor, and 21 represents an AF data generating circuit. An AF actuator 30 acts to so adjust the optical system 12 as to bring it into an in-focus state in accordance with the output from a driver circuit 27. The AE control signal $C_2$ is supplied to the driver 26. An AE actuator 29 controls, in accordance with the output from the driver circuit 26, optical system 12 so as to adjust it to the most suitable diaphragm. The zoom control signal $C_3$ is supplied to the driver circuit 25. A zoom actuator 28 controls the optical system 12 in accordance with the output from the driver circuit 25 so that a desired focal length is realized. The optical system 12 is provided with encoders 31, 32, and 33 for the purpose of confirming the states of operations of the corresponding actuators. The encoder 31 acts to detect the focusing position, the encoder 32 acts to detect the state of the diaphragm, and the encoder 33 acts to detect focal length information by the zoom operation. The thus-detected information is supplied to the lens microcomputer 44. Each item of the encoder information is used to control the lens unit L, and is, if necessary, supplied to the camera microcomputer 19 so as to be used in processings in the AF circuit 16 and AE circuit 17.

The data communication between the camera unit C and the lens unit L is realized via the data communication line 43. The operation sequence of this data communication will now be described with reference to a flow chart shown in FIG. 7.

Figure 7:
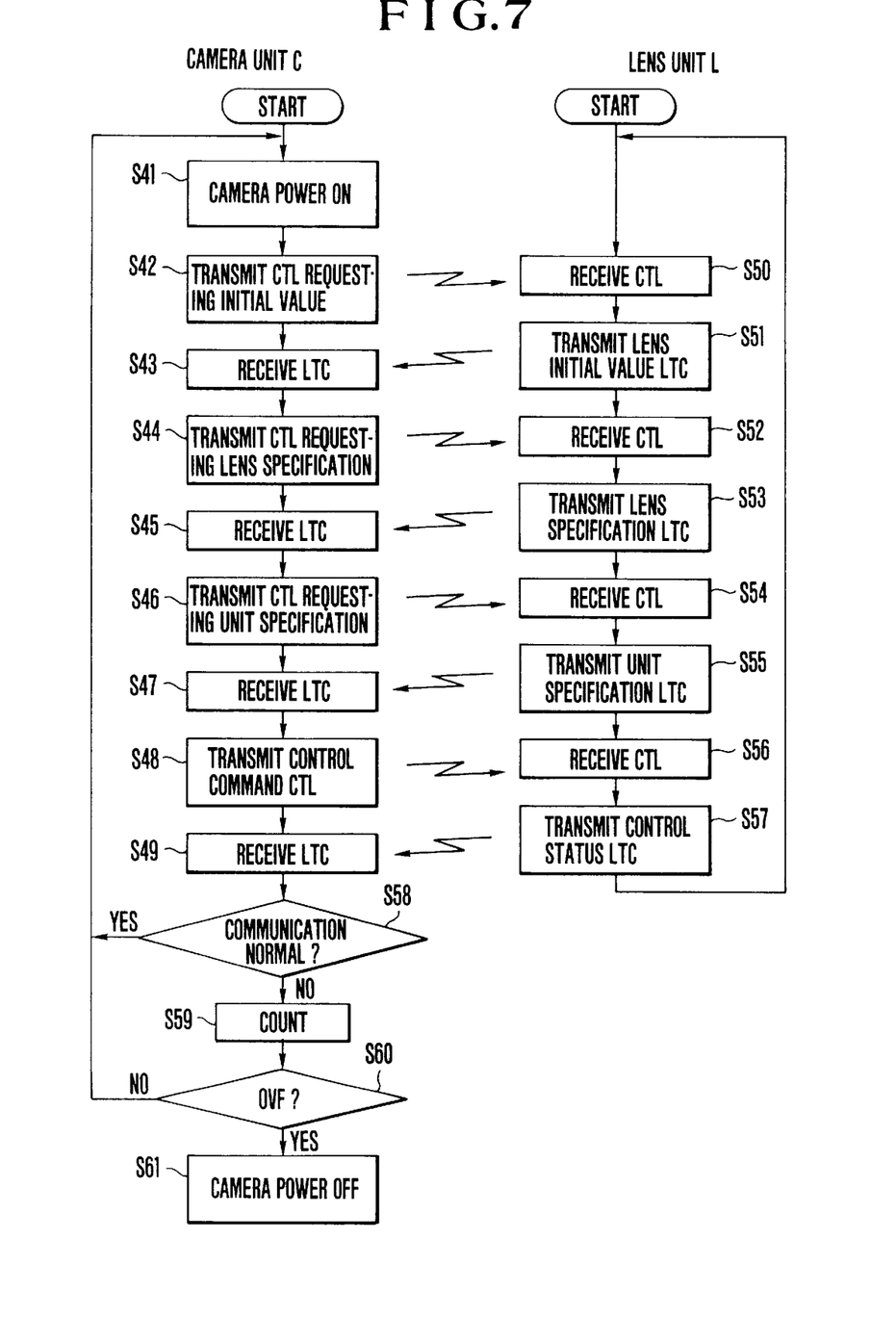
FIG. 7 is a sequence flow chart applicable to the FIG. 6 embodiment.

When the lens unit L is mounted on the camera unit C, the power source for the camera is, in step S41, turned on and power is also supplied to the lens unit L. The camera unit C supplies, in step S42, a CTL (camera-to-lens) signal which demands the initial value. The lens unit L receives the thus-supplied CTL signal via the communication line 43 in step S50.

The lens unit L, upon receipt of this CTL signal, transmits the lens initial value in step S51. The camera unit C receives the thus-supplied lens initial value in step S43 wherein LTC means lens-to-camera. Then, in step S44 the camera unit C demands the lens specifications such as the presence of AF, AE, and zoom to the lens unit L. The lens unit L receives this demand in step S52, and it transmits a response in step S53, and the camera unit C receives it in step S45. In step S46, the specifications for the unite that is, the specifications for each of AF, AE, and zoom are requested. The lens unit L which receives this request in step S54 transmits the following specifications in steps S55 and S47: specifications for AF such as information about whether or not the automatic function is provided, a fact whether the control is the relative positional data control or the absolute positional data control, and information about distance from 1.2 m to ∞; specifications for the AE such as aperture value information F1.2 to F36; and specifications for zoom such as information about the focal length of the lens from 35 mm to 200 mm.

Then, the camera unit C issues, in step S48, a control command to the lens unit L to, for example, move to the end point by a speed 1 in+direction with the relative positional data. In step S57, the lens unit L which has received this command in step S56 supplies, via the communication line 43, positional information as the control status about the position of the lens of the lens unit L such that, for example, the lens is not positioned at the terminal end, but it is positioned in a predetermined area. In step S58, the camera unit C which has received this information in step S49 transmits information via the communication line 43 if the communication function is normal.

The flow returns to the first routine via step S58 so long as the communication between the lens and camera is normal. However, the flow does not necessarily go forward through the predetermined sequential order S41-S42-S43-S44. The flow may jump a step on the basis of the contents of the information supplied to the communication line 43.

When the lens unit L is separated from the camera unit C, the communication line established from the lens unit L is broken. Therefore, the normal return of the signal cannot be conducted. Then, the flow advances from step S58 to step S59 in which a counting operation is started at a cycle of a period (16.67 ms) of a vertical synchronizing signal. Then, in step S60, if a certain predetermined value is allowed to overflow (OVF), the camera power source is switched off in step S61. This causes, referring to the block diagram shown in FIG. 6, the signal to be supplied to the power control portion 34 and for the camera power for the camera unit C to be switched off.

This power control portion 34 may comprise a conventional relay structure or a transistor structure, this power control portion 34 switching off the camera power source.

As described above and according to the fifth embodiment of this invention, the structure is so arranged that if the lens unit is separated from the camera body with the power switched on intact, the power for the camera body can be automatically switched off after a predetermined time period has elapsed. The wasteful consumption of electricity can be prevented.

In particular, a significant effect can be obtained in a case of a battery drive type camera such that consumption of the battery due to user's careless handling can be prevented, this consumption of the battery causing a situation wherein the camera cannot be used when intended.

A sixth embodiment of this invention will now be described.

Figure 8:
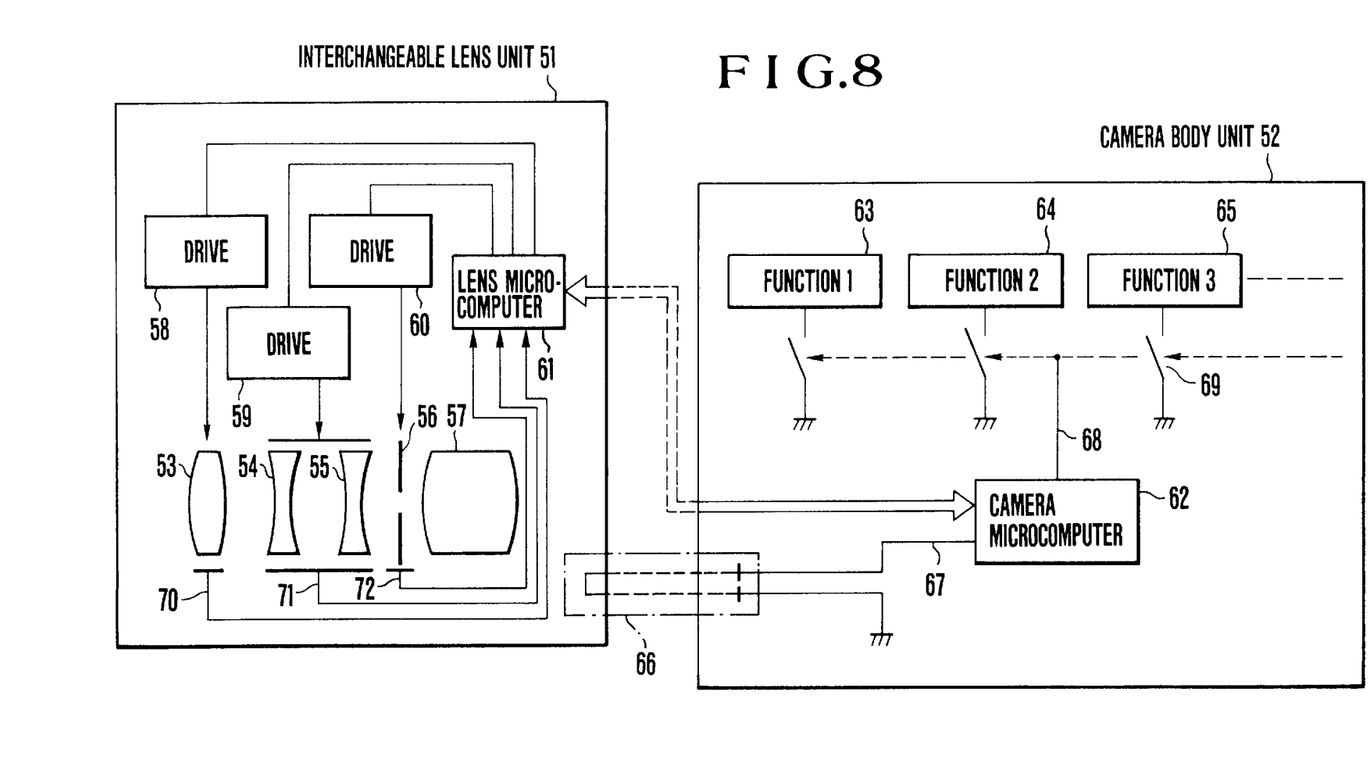
FIG. 8 is a block diagram which illustrates the structure of a control unit of a lens-interchangeable video camera system according to a sixth embodiment of this invention.

FIG. 8 is a block diagram which illustrates the structure of a sixth embodiment of the lens-interchangeable video camera system according to this invention. Reference numeral 51 represents an interchangeable lens unit, and 52 represents a camera body unit, this interchangeable lens unit 51 being arranged to be detachable from the camera body unit 52. Reference numeral 53 represents a focusing lens, 54 and 55 represent a zoom lens group, 56 represents a diaphragm, 57 represents a compensation lens group for forming a correct image on the imaging plane, 58, 59, and 60 represent drive sources for the corresponding focusing lens 54 and the zoom lenses 54 and 55. Reference numerals 70, 71 and 72 represent three encoders and three signal lines for detecting positions of the focusing lens 53, the zoom lens group 54 and 55 and the diaphragm 56 and supplying information on the positions to the lens microcomputer 61. Reference numeral 61 represents a lens microcomputer, 62 represents a camera microcomputer, 63, 64, and 65 represent devices respectively having functions used for photographing such as white balance, AE, shutter speed, and the like. Reference numeral 66 represents an attachment/detachment recognition switch for the interchangeable lens unit 51 with respect to the camera body unit 52. Reference numeral 67 represents a transmission path through which an attachment/detachment recognition signal supplied from the switch 66 passes, 68 represents a transmission path through which a command upon the initialization (state) is transmitted for the above-described functions, and 69 represents a switch function to be switched on during the above-described initialization.

Figure 9:
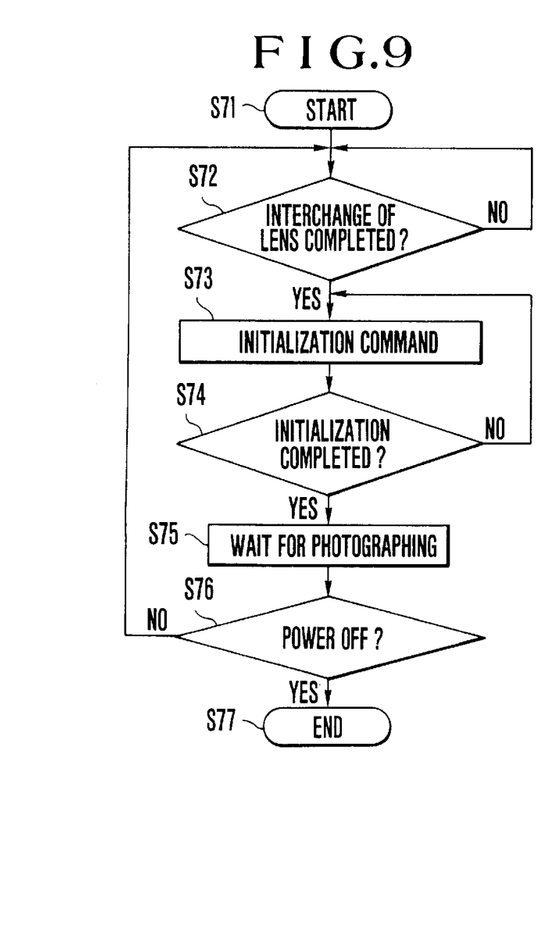
FIG. 9 is a flow chart which illustrates the sequence of a function initializing operation of a microcomputer in the video camera.

FIG. 9 is a flow chart about the function initializing operation for the camera microcomputer 62. In step S71, start declaration is issued. Step S72 is a step in which whether or not the interchange of the lens has been completed is determined, step S74 is a step in which it is determined whether or not the initializations of all of the functions has been completed in accordance with function initialization commands issued in step S73. Step S75 is a step in which the camera is brought to a photographing waiting mode, step S76 is a step in which it is determined whether or not the power is switched on, and step S77 is a step in which a program ending declaration is issued.

Referring to FIG. 8, when the interchangeable lens unit 51 is mounted on the camera body unit 52, the attachment/detachment recognition switch 66 is switched on (or switched off), causing a recognition signal representing that the mounting has been completed to be transmitted through the path 67. This signal is subjected to the determination made in step S72 shown in FIG. 9. If it is determined that the lens has not been changed, the processing in step S72 is repeated. If the mounting of the lens is confirmed, the flow advances to step S73 in which the initialization of each of the camera side functions is made. Then, in step S74, it is determined whether or not the initialization has been completed. If the initialization has not been completed (NO), the processing in step S73 is repeated. If the initialization has been completed, the flow shifts to step S75 in which the photographing waiting mode is realized. The above-described operations are repeated until the switching of the power is confirmed (YES) in step S76. If it is determined that the switching of the power is confirmed, the flow shifts to step S77, and this program is ended here. As a result of the processings/operations above, the error of omitting the initialization after the lens has been changed or malfunction of the camera microcomputer 62 can be prevented.

Figure 10:
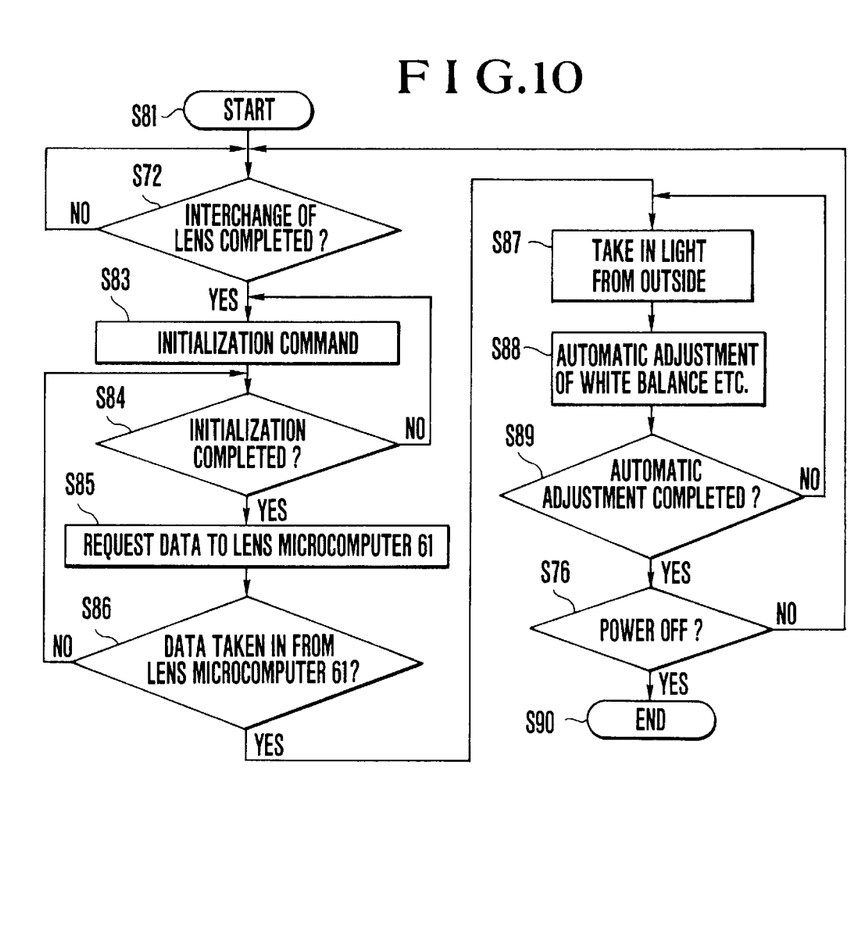
FIG. 10 is a flow chart of a seventh embodiment.

FIG. 10 is a sequence flow chart according to a seventh embodiment in which the initialization operation of the interchangeable lens unit performed by the camera microcomputer 62 is illustrated. According to the sixth embodiment shown in FIG. 9, the initialization is performed by the camera body unit 52. However, according to this embodiment shown in FIG. 10, the initialization is conducted in the lens unit 51. Referring to FIG. 10, the same components (steps S72 and S76) as those shown in FIG. 9 are given the same numerals.

Referring to FIG. 10, step S81 shows the start of the program, and step S72 is a program in which it is determined whether or not the interchange of the lens has been completed. Step S83 is a program in which initialization of each of states of the lens (aperture value, zoom lens position, focusing lens position) is made, and step S84 is a program in which whether or not the lens-state initialization has been completed is determined. Step S85 is a program in which a command for data is made to lens microcomputer 61, and step S86 is a program in which it is determined whether or not data has been taken. Step S87 is a program in which a command for taking light from the outside is issued, and step S88 is a program for performing an adjustment of the white balance or the like. Step S89 is a program in which it is determined whether or not the automatic adjustment has been completed, step S76 is a program in which whether the power is switched on is determined, and step S90 shows a completion declaration of the program.

Referring to FIG. 10, it is determined whether or not the lens has been changed in step S72. If the lens has not been interchanged (NO), the processing in step S72 is repeated. If the lens has been changed (YES), the flow shifts to step S83 in which the states of the lens (aperture value, zoom lens position, focusing lens position) are initialized. Then, in step S84 it is determined whether or not the initialization has been completed. If it has not been completed, the flow returns to step S83. If the initialization has been completed (YES), the flow shifts to step S85 in which data about characteristics such as color of the mounted lens is demanded to the lens microcomputer 61. In step S86, it is determined whether or not data has been taken from the lens microcomputer 61. If the taking of data has not been completed (NO), the flow returns to step S84. If it has been completed (YES), the flow shifts to step S87 in which light is taken from the outside, and white balance or the like is, in step S88, adjusted on the basis of the thus-taken data through the lens. Then, it is determined whether or not the adjustment above has been completed in step S89. If it has not been completed (NO), the flow returns to step S87. Similar to the sequence shown in FIG. 9, the operation above is repeated until the fact that the power source has been switched off is confirmed. If it is determined that the power source has been switched off in step S76 (YES), the flow returns to step S90, and the program is ended here.

As described above, also according to the seventh embodiment, photographing can be performed immediately after the lens has been interchanged by way of automating the adjustments needed to be conducted when the lens is interchanged. Furthermore, the photographing can be performed under proper conditions, and any errors in photographing can be prevented.

The terms "Initializing" and "Initial setting" described in the sixth and seventh embodiments include a case in which a non-standard mode (for example, back-light compensation, and manual focusing) which has been set before the interchange of the lens is cleared after the interchange of the lens and the standard state, that is a full-automatic mode (the automatic focusing (AF) and automatic exposure (AE) and the like), is set.

The "lens attachment/detachment recognition means" is not limited to the mechanical switch 66 as illustrated. It may be structured such that ID information from the lens unit 51 is confirmed by the camera body unit 52 through a communicating means so that it is determined that the lens has been detached/attached and the interchange is recognized upon the recognition of change in the thus-confirmed ID information.

As described above and according to the fifth and sixth embodiments of the lens-interchangeable video camera system according to this invention, since the structure is formed in such a manner that the lens attachment/detachment recognition means thereof recognizes the mounting of an optional interchangeable lens and the lens initialization and the adjustments of the functions thereof can be automatically performed, the re-adjustments needed to be conducted in the conventional systems due to change in the lens characteristics and photographing conditions become unnecessary. Furthermore, since the initialization operation is thus automated, a mistake in the omission of initial adjustment which is necessary to be conducted whenever the lens is interchanged can be prevented. Consequently, photographing can be conducted under satisfactory conditions after the lens has been interchanged.

What is claimed is:

1. A video camera adapted for the mounting thereon of an interchangeable lens, said camera comprising:

recording means for recording on a recording medium image signals indicative of images transmitted through said lens in a camera mode and for recording video signals input from an external input terminal or reproducing recorded signals on the recording medium in a recorder mode, said recording means selectively setting one of said modes;

detection means for detecting whether said lens is or is not precisely mounted on said camera; and control means for inhibiting an operation of said recording means in said camera mode in the case that said detection means detects that said lens is not precisely mounted on said camera and permitting the recording or reproducing operation of said recording means in said recorder mode regardless of a detection result of said detection means.

2. A video camera according to claim 1, wherein said recording means includes a video tape recorder.

3. A video camera according to claim 1, wherein said detection means includes a switch providing output indication of the physical mounting of said lens on said camera.

4. A video camera according to claim 1, wherein said control means continues the operation of said recording means even if the lens is demounted in the recorder mode.

5. A video camera according to claim 1, wherein said recording means is a VTR and is formed integratedly within a casing of the video camera.

6. A video camera adapted for the mounting thereon of an interchangeable lens, said camera comprising:

detection means for detecting mounting of said lens on said camera;

recording means having a recording medium for recording video signals indicative of images transmitted through said lens and having means for rewinding said recording medium; and control means for determining a mounting condition of said lens on said camera and operably responsive to said detection means for temporarily stopping a recording operation by said recording means and for reversing said recording medium in a predetermined amount when said detection means detects that said lens is defectively mounted on said camera.

7. A video camera according to claim 6, wherein said recording means includes a video tape recorder.

8. A video camera according to claim 6, wherein said detection means includes a switch providing output indication of said mounting of said lens on said camera.

9. A video camera according to claim 6, wherein said control means is arranged to prepare a next recording after said tape has been rewound.

10. A video camera according to claim 6, wherein said recording means is a VTR and formed integratedly within a casing of said video camera, and said recording medium is a magnetic tape.

11. An interchangeable lens system in a camera system having a camera unit and a lens unit arranged to be attachable to and detachable from each other and to communicate signals to each other, said interchangeable lens system comprising:

mode setting means for selectively setting a first mode for processing an image formed on an image sensing plane by said lens unit to convert an image signal and a second mode for processing an input signal supplied from external device or a signal reproduced from a recording medium;

detection means for detecting mounting and demounting state of the lens unit on said camera unit by sensing an interruption of communication between said camera unit and said lens unit; and control means in said first mode operably responsive to said detection means for turning off a power source of said camera unit, in the case that a detection by said detection means of an interruption of communication between said lens unit and said camera unit continued for a predetermined time.

12. An interchangeable lens system according to claim 11, wherein said control means includes timer means for counting time lapse for the interruption of communication between said lens unit and said camera unit.

13. An interchangeable lens system according to claim 11, which further comprises recording means which records the image signal and the input signal respectively in the first and second modes.

14. An interchangeable system according to claim 11, wherein said communication is performed at a predetermined period of time.

15. A lens-unit-interchangeable camera apparatus, comprising:

mode setting means for selectively setting a first mode for processing an image formed on an image sensing plane by said lens unit to convert an image signal and a second mode for processing an input signal supplied from external device or a signal reproduced from a recording medium, power source controlling means for controlling ON and OFF of a main power source for the lens unit and the camera apparatus, detection means for detecting the mounting and dismounting of the lens unit on the camera apparatus, communication means for communicating control information between the lens unit and the camera apparatus, and control means for causing the communication means to perform an initialization operation when the mounting operation of the lens unit onto the camera apparatus regardless of the state of said power source and controlling said power source controlling means to turn off said main power source in response to an interruption of communication by said communication means in said first mode for a predetermined time.

16. A lens-unit-interchangeable camera apparatus according to claim 15, wherein the control means controls the main power source according to the operation state of the power source control means after the completion of the initialization operation.

17. A lens-unit-interchangeable camera apparatus according to claim 15, wherein an actuator for varying optical condition is provided in the lens unit, and the control means initializes the actuator.

18. A lens-unit-interchangeable camera apparatus according to claim 15, wherein an actuator for controlling the operation of the camera apparatus is provided in the camera apparatus, and the control means initializes the actuator.

19. An apparatus according to claim 15, which further comprises recording means which records the image signal and the input signal respectively in the first and second modes.

20. An apparatus according to claim 15, wherein said communication is performed at a predetermined period of time.

21. A camera control of a video camera adapted for the mounting thereon of an accessory unit, said camera control apparatus comprising:

recording means for recording on a recording medium image signals indicative of images transmitted through a lens of said accessory unit in a first recording mode and for recording image signals input from an external input terminal or reproducing recorded signals on the recording medium in a second recording mode, said recording means selectively setting one of said modes;

detection means for detecting whether said accessory unit is or is not precisely mounted on said camera control apparatus; and control means for inhibiting an operation of said recording means in said first recording mode in the case that said detection means detects that said accessory unit is not precisely mounted on said camera control apparatus and permitting the recording or reproducing operation of said recording means in said second recording mode regardless of a detection result of said detection means.

22. A camera control apparatus according to claim 21, wherein said recording means includes a video tape recorder.

23. A camera control apparatus according to claim 21, wherein said detection means includes a switch providing output indication of the physical mounting of said accessory unit on said camera control apparatus.

24. A camera control apparatus according to claim 21, wherein said control means continues the operation of said recording means even if said accessory unit is demounted in the second recording mode.

25. A video camera according to claim 21, wherein said recording means is a VTR and is formed integratedly within a casing of the video camera.

26. A camera control apparatus in a camera system having a camera unit and an accessory unit arranged to be attachable to and detachable from each other and to communicate signals to each other, said camera control apparatus comprising:

mode setting means for selecting setting a first mode for processing an image formed on an image sensing plane by said accessory unit to convert an image signal and a second mode for processing an input signal supplied from an external device or a signal reproduced from a recording medium;

detection means for detecting mounting and demounting state if said accessory unit on said camera unit by sensing an interruption of communication between said camera unit and said accessory unit; and control means in said first mode operably responsive to said detection means for turning off a power source of said camera unit, in the case that a detection by said detection means of an interruption of communication between said accessory unit and said camera unit continued for a predetermined time.

27. A camera control apparatus according to claim 26, wherein said control means includes a timer means for counting time lapse for the interruption of communication between said accessory unit and said camera unit.

28. A camera control apparatus according to claim 26, which further comprises recording means which records the image signal and the input signal respectively in the first and second modes.

29. A camera control apparatus according to claim 26, wherein said communication is performed for a predetermined period of time.

30. A camera control method for controlling a video camera amd an accessory detachable to said camera, comprising:

selecting step of setting of a mode of recording means for recording on a recording medium image signals indicative of images transmitted through said accessory in a camera mode and for recording image signals input from an external medium in a recorder mode;

detection step of detecting whether said accessory is or is not precisely mounted on said camera; and control step of inhibiting an operation of said recording means in said camera mode in the case that said detection means detects that said accessory is not precisely mounted on said camera and permitting the recording or reproducing operation of said recording means in said recorder mode regardless of detection result of said detection step.

31. A camera control method according to claim 30, wherein said recording means includes a video tape recorder.

32. A camera control step according to claim 30, wherein said detection step includes providing through a switch indicating of the physical mounting of said accessory on said camera.

33. A control method according to claim 30, wherein said control step continues the operation of said recording means even if the accessory is demounted in the recorder mode.

34. A camera control method according to claim 30, wherein said recording means is a VTR and is formed integratedly within a casing of the video camera.

* * * * *

UNITED STATES PATENT AND TRADEMARK OFFICE
CERTIFICATE OF CORRECTION

PATENT NO. : 6,097,511
DATED : August 1, 2000
INVENTOR(S) : Masahide Hirasawa, et al.

It is certified that error appears in the above-identified patent and that said Letters Patent is hereby corrected as shown below:

Column 2,
Line 38, delete "that are needed" and insert -- that is needed --.

Column 11,
Line 36, delete "recording video" and insert -- recording image --.

Column 13,
Line 32, delete "camera control of" and insert -- camera control apparatus of --.

Column 14,
Line 41, delete "external medium in a recorder mode;" and insert -- external input terminal or reproducing recording signals on the recording medium in a recorder mode; --.
Line 55, delete "indicating" and insert -- indication --.

Signed and Sealed this

Thirteenth Day of November, 2001

Attest:

*Nicholas P. Godici*

NICHOLAS P. GODICI
*Attesting Officer*    *Acting Director of the United States Patent and Trademark Office*